United States Patent
Chen

(10) Patent No.: US 11,922,152 B2
(45) Date of Patent: Mar. 5, 2024

(54) WORKLOAD ORIENTED CONSTANT PROPAGATION FOR COMPILER

(71) Applicant: INTEL CORPORATION, Santa Clara, CA (US)

(72) Inventor: Yuan Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 17/430,394

(22) PCT Filed: Feb. 26, 2019

(86) PCT No.: PCT/CN2019/076128
§ 371 (c)(1),
(2) Date: Aug. 12, 2021

(87) PCT Pub. No.: WO2020/172788
PCT Pub. Date: Sep. 3, 2020

(65) Prior Publication Data
US 2022/0147331 A1 May 12, 2022

(51) Int. Cl.
*G06F 8/41* (2018.01)
*G06F 9/50* (2006.01)

(52) U.S. Cl.
CPC .............. *G06F 8/4441* (2013.01); *G06F 8/42* (2013.01); *G06F 8/4434* (2013.01); *G06F 9/505* (2013.01)

(58) Field of Classification Search
None
See application file for complete search history.

(56) References Cited

U.S. PATENT DOCUMENTS

| | | | | |
|---|---|---|---|---|
| 5,230,050 A * | 7/1993 | Iitsuka | ...................... | G06F 8/48 717/145 |
| 5,805,895 A * | 9/1998 | Breternitz, Jr. | ..... | G06F 9/45504 717/160 |
| 5,999,735 A * | 12/1999 | Radigan | .................... | G06F 8/41 717/146 |
| 6,016,398 A * | 1/2000 | Radigan | .................. | G06F 8/441 717/152 |
| 6,427,234 B1 * | 7/2002 | Chambers | ........... | G06F 9/45516 717/148 |

(Continued)

FOREIGN PATENT DOCUMENTS

| | | |
|---|---|---|
| CN | 104335218 A | 2/2015 |
| JP | 2003-196106 | 7/2003 |
| WO | 2018/127557 A1 | 7/2018 |

OTHER PUBLICATIONS

Lee, J. et al. (1998). Concurrent static single assignment form and constant propagation for explicitly parallel programs. In: Languages and Compilers for Parallel Computing. LCPC 1997. Lecture Notes in Computer Science, vol. 1366. Springer, Berlin, Heidelberg (Year: 1998).*

(Continued)

*Primary Examiner* — Jason D Mitchell
(74) *Attorney, Agent, or Firm* — Jordan IP Law, LLC

(57) ABSTRACT

An embodiment of a semiconductor package apparatus may include technology to identify workload control variables, add workload flags to respective edges in a static single assignment graph, and propagate constants based on the identified workload control variables and the workload flags. Other embodiments are disclosed and claimed.

25 Claims, 7 Drawing Sheets

(56) References Cited

U.S. PATENT DOCUMENTS

| | | | | |
|---|---|---|---|---|
| 6,738,967 B1* | 5/2004 | Radigan | ............... | G06F 8/47 |
| | | | | 717/146 |
| 7,181,735 B1* | 2/2007 | Haraguchi | ............... | G06F 8/443 |
| | | | | 717/146 |
| 7,814,467 B2* | 10/2010 | Li | ............... | G06F 8/443 |
| | | | | 717/136 |
| 9,245,125 B2* | 1/2016 | Li | ............... | G06F 21/554 |
| 2007/0094646 A1 | 4/2007 | Higham | | |
| 2008/0028380 A1* | 1/2008 | Guo | ............... | G06F 8/433 |
| | | | | 717/151 |
| 2009/0125894 A1 | 5/2009 | Nair et al. | | |
| 2012/0117552 A1* | 5/2012 | Krishnaiyer | ............... | G06F 8/41 |
| | | | | 717/160 |
| 2012/0144376 A1* | 6/2012 | Van Eijndhoven | ............... | G06F 8/456 |
| | | | | 717/146 |
| 2014/0026111 A1* | 1/2014 | Stitt | ............... | G06F 8/4441 |
| | | | | 717/101 |
| 2015/0106596 A1* | 4/2015 | Vorbach | ............... | G06F 9/3877 |
| | | | | 712/221 |
| 2015/0378696 A1* | 12/2015 | Boehm | ............... | G06F 8/445 |
| | | | | 717/149 |
| 2019/0034178 A1 | 1/2019 | Goetz et al. | | |

OTHER PUBLICATIONS

International Search Report and Written Opinion for International Application No. PCT/CN2019/076128, dated Jun. 19, 2019, 9 pages.

Wegman et al., "Constant Propagation with Conditional Branches," IBM T.J. Waston Research Center, ACM Transactions of Programming Languages and Systems, vol. 13, No. 2, Apr. 1991, pp. 181-210.

* cited by examiner

Meeting rule for the linear lattice:
$(C_i, a) \sqcap (T, 0) = (C_i, a)$
$(T, 0) \sqcap (C_i, a) = (C_i, 1)$
$(C_i, a) \sqcap (C_j, b) = (C_j, a+1)$    if $i!=j$ && $a<M$
$(C_i, a) \sqcap (C_j, b) = (\bot, M+1)$    if $i!=j$ && $a==M$
$(C_i, a) \sqcap (C_j, b) = (C_j, a)$        if $i==j$
$(\bot, M+1) \sqcap (C_j, j) = (\bot, M+1)$
$(C_i, a) \sqcap (\bot, M+1) = (\bot, M+1)$

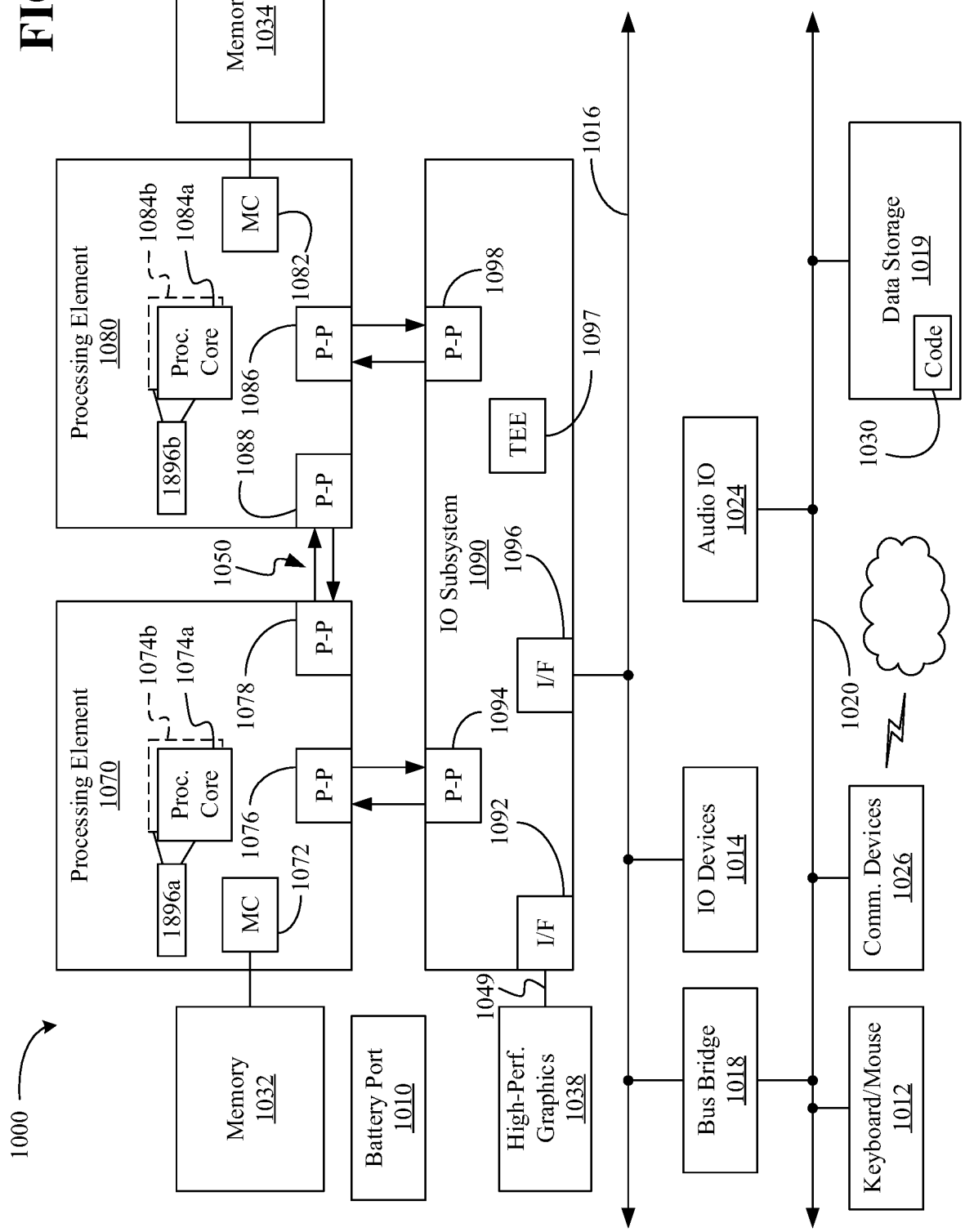

WORKLOAD ORIENTED CONSTANT PROPAGATION FOR COMPILER

CROSS REFERENCE TO RELATED APPLICATIONS

The present application is a U.S. National Phase Patent Application, which claims the benefit of priority to International Patent Application No. PCT/CN2019/076128 filed on Feb. 26, 2019.

TECHNICAL FIELD

Embodiments generally relate to compilers. More particularly, embodiments relate to a workload oriented constant propagation for a compiler.

BACKGROUND

Compiler technology includes a wide variety of optimizations, including constant propagation. Constant propagation refers to the substitution of the values of known constants in expressions at compile time. Sparse conditional constant (SCC) propagation is a compiler optimization that may be applied after conversion to static single assignment (SSA) form.

BRIEF DESCRIPTION OF THE DRAWINGS

The various advantages of the embodiments will become apparent to one skilled in the art by reading the following specification and appended claims, and by referencing the following drawings, in which:

FIG. 9 is a block diagram of an example of a system according to an embodiment.

DESCRIPTION OF EMBODIMENTS

Figure 1:
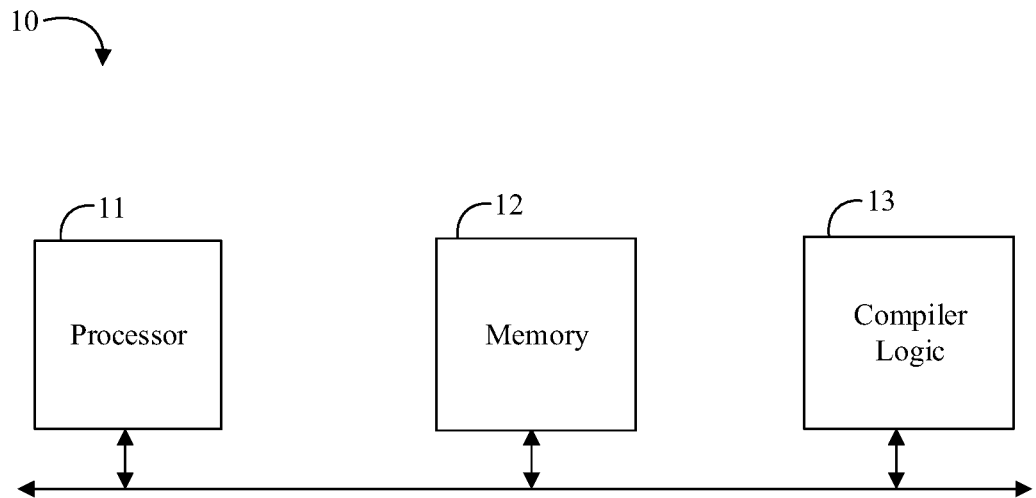
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and compiler logic 13 communicatively coupled to the processor 11 to identify workload control variables (WCVs), add workload flags to respective edges in a static single assignment graph, and propagate constants based on the identified WCVs and the workload flags. In some embodiments, the compiler logic 13 may be configured to receive a compiler directive to identify the WCVs. Alternatively, or additionally, the compiler logic 13 may be configured to identify the WCVs through a static analysis of code to be compiled. For example, the compiler logic 13 may also be configured to constrain compiler time and space complexity under an asymptotic bounds for constant propagation based on the identified WCVs and the workload flags. In some embodiments, the compiler logic 13 may be further configured to utilize an M-level lattice and depth first search to trace constant footprints, where M is greater than or equal to one (1). For example, the constant footprints may include one or more of global constants and partial constant instances. In some embodiments, the compiler logic 13 may be located in, or co-located with, various components, including the processor 11 (e.g., on a same die).

Embodiments of each of the above processor 11, memory 12, compiler logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the processor 11 may include a general purpose processor, a special purpose processor, a central processor unit (CPU), a controller, a micro-controller, etc.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the compiler logic 13, identifying the WCVs, adding the workload flags to the respective edges in the SSA graph, propagating constants based on the identified WCVs and the workload flags, etc.).

Figure 2:
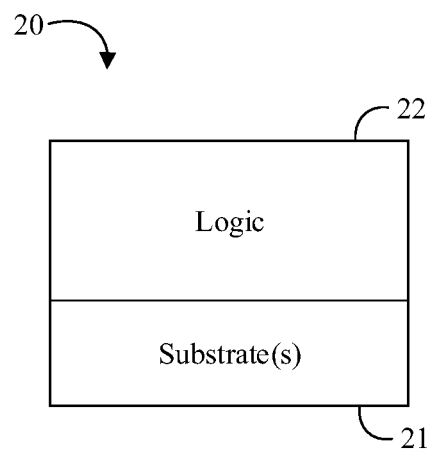
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates may be configured to identify WCVs, add workload flags to respective edges in a static single assignment graph, and propagate constants based on the identified WCVs and the workload flags. In some embodiments, the logic 22 may be configured to receive a compiler directive to identify the WCVs. Alternatively, or additionally, the logic 22 may be configured to identify the WCVs through a static analysis of code to be compiled. For example, the logic 22 may also be configured to constrain compiler time and space complexity under an asymptotic bounds for constant propagation based on the identified WCVs and the workload flags. In some embodiments, the logic 22 may be further configured to utilize an M-level lattice and depth first search to trace constant footprints, where M is greater than or equal to one (1). For example, the constant footprints may include one or more of global constants and partial constant instances. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIG. 3), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3:
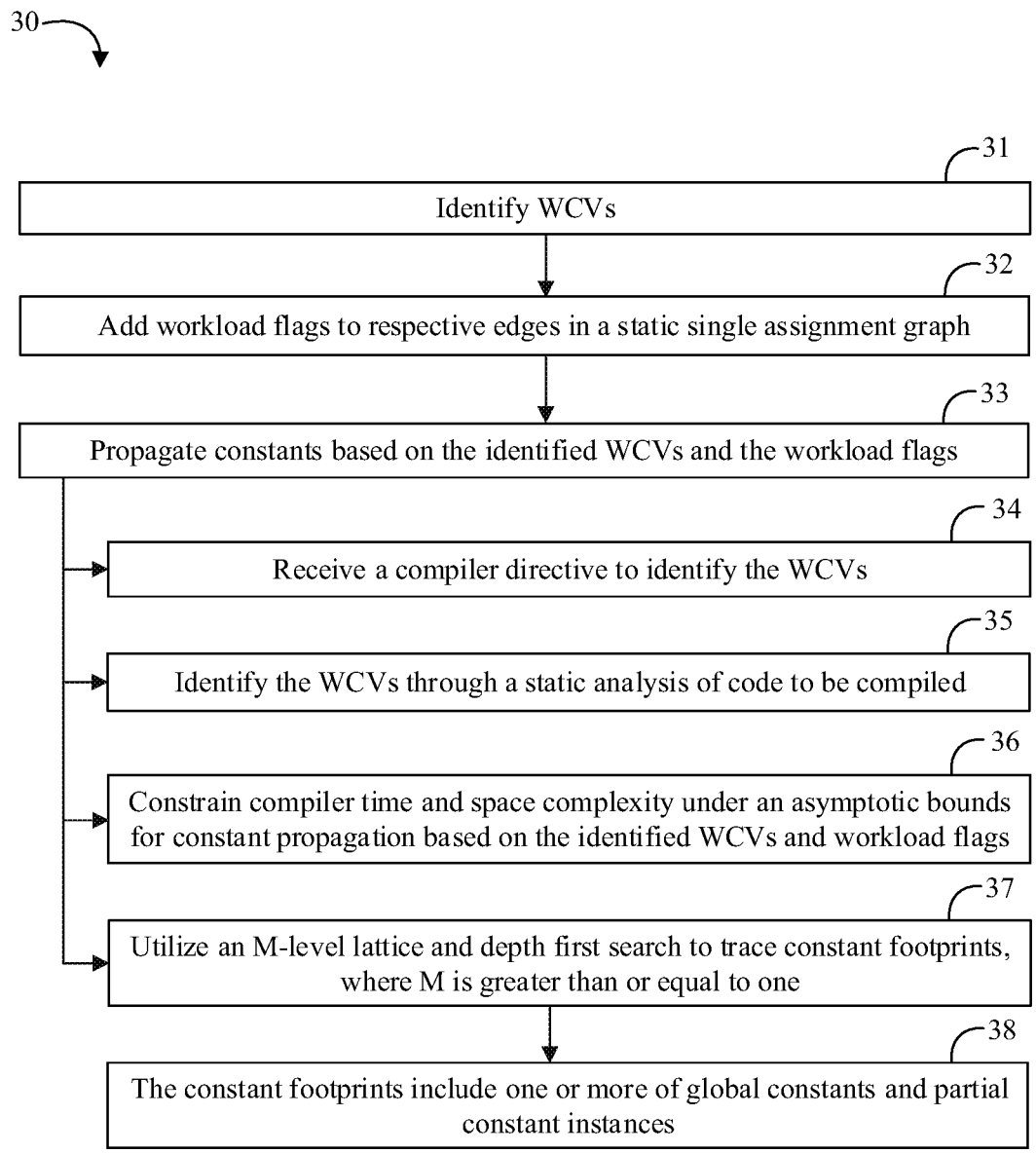
FIG. 3 is a flowchart of an example of a method of compiling according to an embodiment.

Turning now to FIG. 3, an embodiment of a method 30 of compiling may include identifying WCVs at block 31, adding workload flags to respective edges in a static single assignment graph at block 32, and propagating constants based on the identified WCVs and the workload flags at block 33. In some embodiments, the method 30 may include receiving a compiler directive to identify the WCVs at block 34. Alternatively, or additionally, the method 30 may include identifying the WCVs through a static analysis of code to be compiled at block 35. For example, the method 30 may further include constraining compiler time and space complexity under an asymptotic bounds for constant propagation based on the identified WCVs and workload flags at block 36. Some embodiments of the method 30 may further include utilizing an M-level lattice and depth first search to trace constant footprints, where M is greater than or equal to one, at block 37. For example, the constant footprints include one or more of global constants and partial constant instances at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide compiler technology for workload oriented constant propagation. Workload information, such as loop counts, image size, etc., often includes constant information that can be available at compile time. Due to the limitations of some conventional constant propagation strategies, some kinds of constant information sometimes cannot be considered constants internally through procedure calls, unless procedure integration is applied which may cause code explosion when the call stack is deep. For example, in applications such as deep convolutional neural networks (CNNs), the network will normally contain several convolutional layers that call the same "conv2d" functions multiple times with different parameters. Some of those parameters such as the tensor shape (width, height, channels), filter size, strides, etc., can be compile time constants for a specific layer. Such constant information can be considered as workload information in optimizing the generic "conv2d" function to provide better performance based on targeting hardware resources, such as cache, instruction vector length, etc. An example code snippet using Tensorflow follows:

```
images = tf.reshape(x, (-1, 28, 28, 3))
// input shape 28*28*3
Conv1 = tf.layers.conv2d(images, filters=32, kernel_size=5, strides=2,
    padding='SAME')
// input shape 14*14*32
Conv2 = tf.layers.conv2d(conv1, filters=64, kernel_size=5, strides=2,
    padding='SAME')
// input shape 7*7*64
Conv3 = tf.layers.conv2d(conv2, filters=128, kernel size=3, strides=2,
    padding='SAME')
```

In the preceding tensorflow neural network snippet, optimization on a "tf.layers.conv2d" call for an input shape of 28*28*3 can be completely different than optimization on the same "tf.layers.conv2d" call for an input shape of 7*7*64. Some other compiler optimization technology may utilize procedure inline technology, runtime libraries, and/or domain specific compilation to optimize the compilation. For procedure inline technology, by integrating the procedures in different call sites, workload information becomes naturally constant for each separate copy of the respective call site. In practice, however, the real computing intensive procedures (e.g., referred to as kernel procedures herein) actually using those workload variables for calculation are often defined under a deep class hierarchy or call stack. A long path may occur between the constant initialization site and the kernel procedure call site, which means to integrate the constant workload information to the kernel procedure requires inlining of all the intermediate procedures through the stack. Inlining the intermediate procedures may cause code explosion that is actually unnecessary if the only information that is needed is particular workload constants.

Most hardware providers will publish highly optimized runtime libraries for various performance critical kernel procedures. To deal with optimization on different workloads multi-versioned implementations with dynamic workload checks are added to those libraries. Dynamic workload checks are general based on ranges. Specific workloads optimization can only be added case by case which makes the library heavy and difficult to make portable when the hardware architecture changes. Dynamic workload checks also cannot cover all real user cases that often work best on some workloads while becoming worse on others. For domain specific compilation, some just in time (JIT) compilation technology optimizes the kernel procedures based on workload information obtained at runtime. Some JIT compilers, however, may require multiple code transformations and may be limited to basic pattern-matching optimizations.

Advantageously, some embodiments may provide technology for a compiler directive to identify WCVs, and add a workload flag ("WorkloadFlag") to respective edges in a SSA graph to constrain algorithm time and space complexity under similar asymptotic bounds to conventional constant propagation. Some embodiments may also utilize a M-level lattice and a depth first search to trace constant footprints that exploits not only global constants, but also partial constant instances for further compiler optimization.

Some embodiments of a compiler can implement more specialization on performance critical kernel procedures for different workloads which makes optimization portable for multiple hardware platforms and more flexible for architecture changes as compared to runtime libraries. In some embodiments, more workload constants may be passed to kernel procedures instead of directly inlining those procedures through a deep call stack, and optimizations can be more readily applied on existing large and complex frameworks. Advantageously, some embodiments provide optimization technology to be adaptive to changing workloads or applications.

Figure 4:
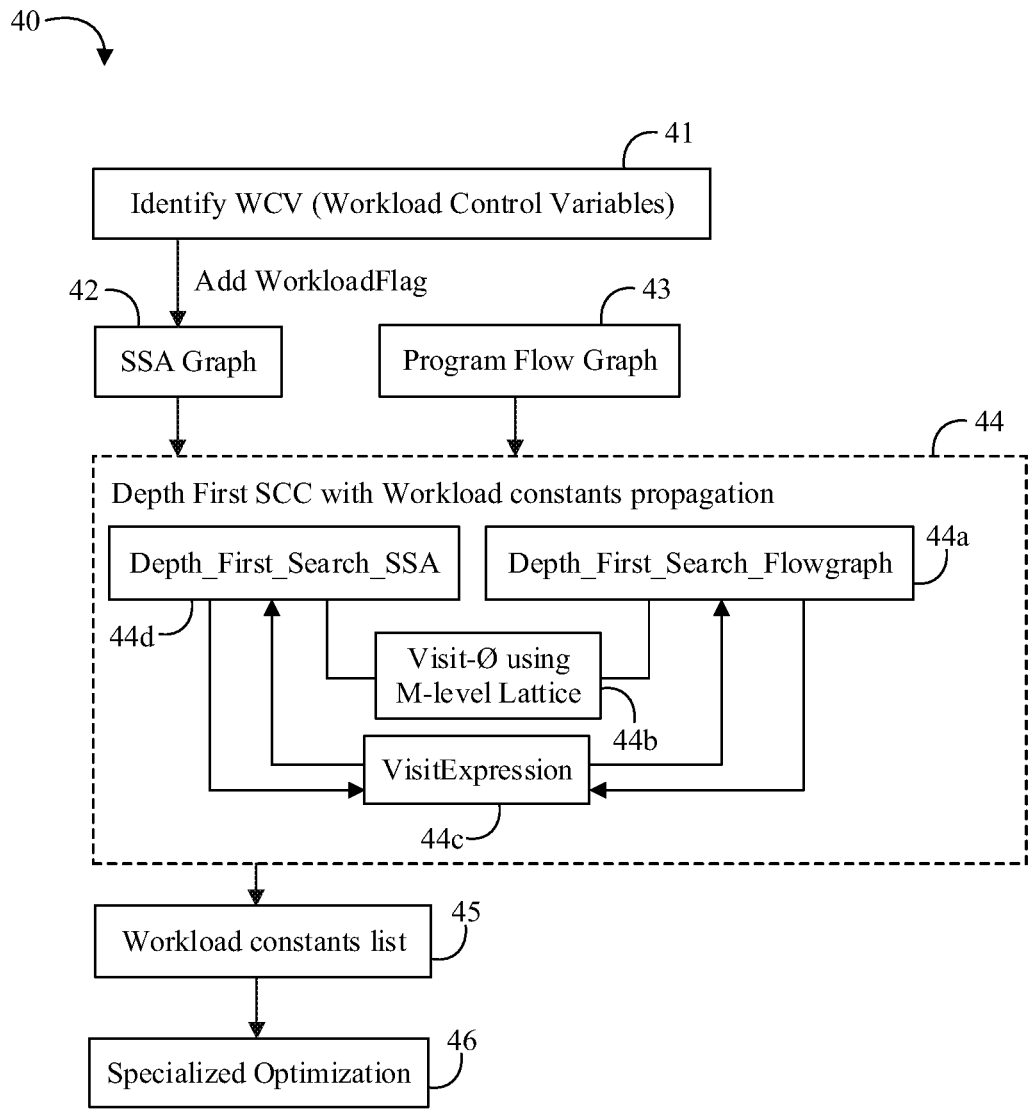
FIG. 4 is a flowchart of an example of a process flow for depth first SCC with workload constant propagation according to an embodiment.

Turning now to FIG. 4, an embodiment of a process flow 40 illustrates an example of a depth first SCC with workload constant propagation. The flow 40 includes identifying WCVs at block 41, adding WorkloadFlag to the SSA graph at block 42, and providing a program flow graph at block 43. The flow 40 may then include performing depth first SCC with workload propagation on the SSA graph and the program flow graph at block 44, followed by outputting a workload constants list at block 45, and performing specialized optimizations at block 46. For the depth first SCC at block 44, as described in more detail below, the flow 40 may start with performing a depth first search of the program flow graph at block 44a, and performing Visit-Ø on a destination node at block 44b (where Ø corresponds to a Phi function). The flow 40 may then include, as described in more detail below, performing VisitExpression to evaluate an expression at block 44c. If the expression is part of an assignment node, the flow 40 may include performing a depth first search of the SSA graph for all SSA edges at block 44d (e.g., as described in more detail below). If the expression controls a conditional branch, the flow 40 may include performing a depth first search of the program flow graph on the edge according to the value of condition expression (e.g., as described in more detail below).

A program may normally spend most of the program's time in executing loops. Accordingly, identifying WCVs involves finding all variables controlling loop counts. Some embodiments may advantageously define a compiler directive to allow a programmer to specify the workload variables directly. In practice, however, WCVs may also be identified through a compiler's static analysis which will involve all loops that can make the compilation time longer.

In some embodiments, the compiler directive may be defined within the kernel procedures that are critical to performance. Each directive specifies a list of workload variables as a whole and provides the hint for the compiler's specialized optimization on the kernel procedure. The following pseudo-code shows a "C" programming language example of a workload compiler directive as an added pragma "workload" in the "Conv2d" kernel function:

```
Conv2d (float *images, float *filter, float *out, int width, int high, int channel,
        int R, int stride) {
    #pragma workload(width, high, channel, R, stride)
    For (int i=0; i<width; i+=stride) {
        For (int j=0; j<high; j+=stride) {
            Int s=0;
            For (int c=0; c<channel; c++)
                For (int k=0; k<R; k++) {
                    For (int l=0; l<R; l++) {
                        s += images[i+k][j+l]* filter [k][l];
                    }
                }
            out[i/stride][j/stride] = s;
        }
    }
}
```

Figure 5:
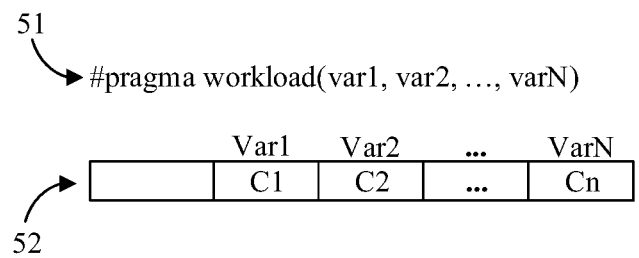
FIG. 5 is an illustrative representation of a workload compiler directive and a corresponding WorkloadList structure according to an embodiment.

Turning now to FIG. 5, an embodiment of a general format of workload compiler directive 51 is shown together with an embodiment of a corresponding WorkloadList structure 52. For example, a WorkloadList structure 52 may be associated with each workload compiler directive 51. The WorkloadList structure 52 stores a list of workload instances containing values for the whole combination of workload variables. For the workload compiler directive 51, #pragma workload(var1, var2, . . . , varN), Var1 . . . VarN correspond to valid variable names defined in the kernel procedure. The WorkloadList structure 52 contains groups of constant values of respective variables that represent different instances of workloads.

Figure 6:
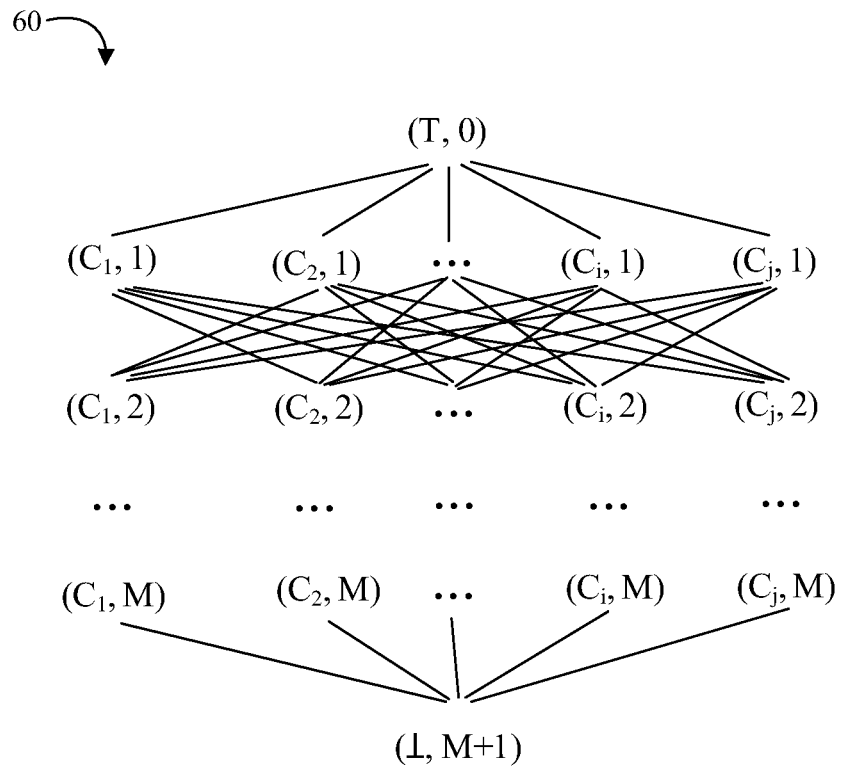
FIG. 6 is an illustrative representation of a M-level lattice and meeting rules according to an embodiment.

Turning now to FIG. 6, an embodiment of a matrix structure may be referred to as a M-level lattice 60. For example, some embodiments also adjust the constant propagation lattice to be able to record all constant instances through the flow graph, which may be visually represented as shown by the M-level lattice 60, with the illustrated meeting rules, where T corresponds to a top of the matrix, ⊥ corresponds to a bottom of the matrix (e.g., corresponding to a terminal state), and π represents a set intersection operation. Each Ci represents an arbitrary constant. M is a preset fixed number (e.g., M>1) to control the number of constants the lattice can transit.

Some embodiments may provide technology based on classic SCC propagation with the following changes: 1) Constant values are evaluated using M-level lattice; 2) Using Depth First Search instead of iterative traversal to trail values of WCVs along the same execution path; and 3) Adding the WorkloadFlag to adjust M when evaluating the M-level lattice value. For a WCV, some embodiments may require more than twice lowering depending on the value of M. For all other variables, they only can be lowered twice as before. Applying the foregoing restrictions on M advantageously avoids asymptotic complexity expansion for large values of M. Some embodiments may advantageously provide similar asymptotic complexity as compared to conventional SCC while obtaining the WCV's constant values.

Some embodiments initially add a WorkloadFlag for each SSA edge to indicate whether the edge links to workload variables. For each variable listed in a workload compiler directive, some embodiments traverse through use-def chains in the SSA graph from a variable def site and variables used in the expression part. The WorkloadFlag is set to True for all edges visited in the traversal. Similar to SCC techniques, some embodiments also add an ExecutableFlag for each program flow graph edge and set the ExecutableFlag as a default to False. Each LatticeCell is initially set to T.

Some embodiments then start Depth_First_Search_Flowgraph from an entry edge in the program flow graph until terminated, where Depth_First_Search_Flowgraph(Edge) is defined as follows:
If the ExecutableFlag of this Edge is True, return.
Mark ExecutableFlag of this Edge to True.
Perform Visit-Ø on the destination node.
If there's only one in-edge with ExecutableFlag True, perform VisitExpression at the destination node.
If there's only one outer edge, perform Depth_First_Search_Flowgraph on this Edge.
In some embodiments, Visit-Ø is defined as follows:
The LatticeCell for each operand of the Ø-function is defined on the basis of the ExecutableFlag of the corresponding program flow edge. If the ExecutableFlag is True, the value of the LatticeCell is the meet of the current value and the LatticeCell value at the definition end:

LatticeCell($V_i$)=LatticeCell($V_i$)πLatticeCell($V_j$)

If the LatticeCell value of operand Vi changed in this visit, the output of the Ø function is defined to be the meet of current output LatticeCell value and Vi's LatticeCell value:

LatticeCell(Ø-function)=LatticeCell(Ø-function) πLatticeCell($V_i$)

If no such operand, then the LatticeCell value of the output of the Ø function remains unchanged.
In some embodiments, VisitExpression is defined as follows:
Evaluate the expression obtaining the values of the operands from the LatticeCells where they are defined.
If the expression is part of an assignment node, call Depth_First_Search_SSA for all SSA edges starting at the definition in this node. It's better to follow this sequence: edges that point to dominant nodes of the destination nodes comes first before other edges.
If the expression controls a conditional branch, perform Depth_First_Search_Flowgraph on the edge according to the value of condition expression.
In some embodiments, Depth_First_Search_SSA(Edge) is defined as follows:
Examine the ExecutableFlags of program flow graph edges reaching the destination node, if none of them are True, return.
If the destination of this Edge is the workload compiler directive, add values of the workload variables into WorkloadList associated to this node. Return.
If the destination of this Edge is a Ø-function,
If the WorkloadFlag associated at this Edge is False, perform Visit-Ø with M=1. (e.g., when passing general constants together with workload constants)
Else perform Visit-O with default M.
If the destination of this Edge is an expression, perform VisitExpression.

Figure 7A:
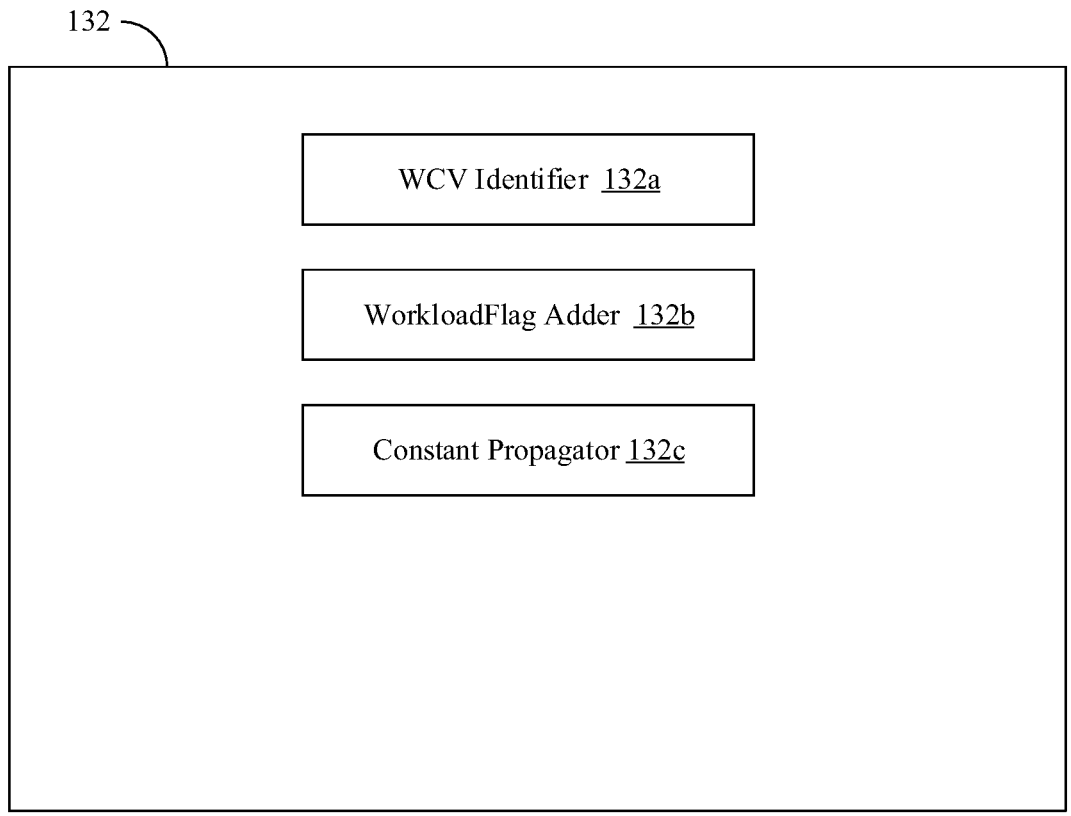
FIGS. 7A and 7B are block diagrams of examples of compiler apparatuses according to embodiments.

FIG. 7A shows a compiler apparatus 132 (132a-132c) that may implement one or more aspects of the system 10, the apparatus 20, method 30, the flow 40, the WorkloadList structure 52, the M-level lattice 60, and/or any of the other embodiments described herein. The compiler apparatus 132, which may include logic instructions, configurable logic, fixed-functionality hardware logic, may be readily substituted for the compiler logic 13 (FIG. 1), already discussed. A WCV identifier 132a may identify WCVs. A WorkloadFlag adder 132b may add workload flags to respective edges in a static single assignment graph. A constant propagator 132c may propagate constants based on the identified WCVs and the workload flags. In some embodiments, the WCV identifier 132a may be configured to receive a compiler directive to identify the WCVs. Alternatively, or additionally, the WCV identifier 132a may be configured to identify the WCVs through a static analysis of code to be compiled. For example, the constant propagator 132c may be configured to constrain compiler time and space complexity under an asymptotic bounds for constant propagation based on the identified WCVs and the workload flags. In some embodiments, the constant propagator 132c may be further configured to utilize an M-level lattice and depth first search to trace constant footprints, where M is greater than or equal to one (1). For example, the constant footprints may include one or more of global constants and partial constant instances.

Figure 7B:
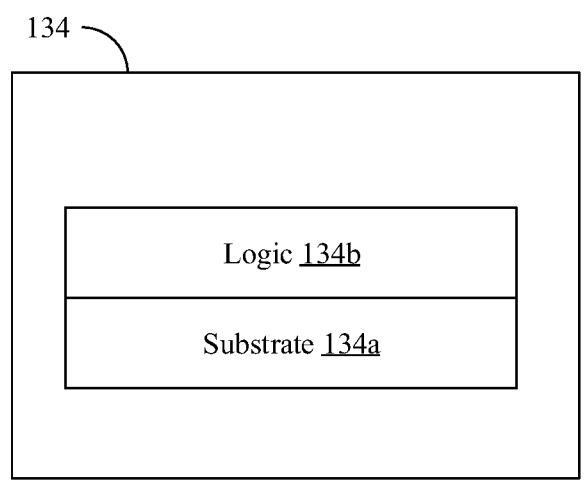

Turning now to FIG. 7B, compiler apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the system 10, the apparatus 20, method 30, the flow 40, the WorkloadList structure 52, the M-level lattice 60, and/or any of the other embodiments described herein. Thus, the logic 134b may include technology to identify WCVs, add workload flags to respective edges in a static single assignment graph, and propagate constants based on the identified WCVs and the workload flags. In some embodiments, the logic 134b may be configured to receive a compiler directive to identify the WCVs. Alternatively, or additionally, the logic 134b may be configured to identify the WCVs through a static analysis of code to be compiled. For example, the logic 134b may also be configured to constrain compiler time and space complexity under an asymptotic bounds for constant propagation based on the identified WCVs and the workload flags. In some embodiments, the logic 134b may be further configured to utilize an M-level lattice and depth first search to trace constant footprints, where M is greater than or equal to one (1). For example, the constant footprints may include one or more of global constants and partial constant instances. In one example, the apparatus 134 is a semiconductor die, chip and/or package.

Figure 8:
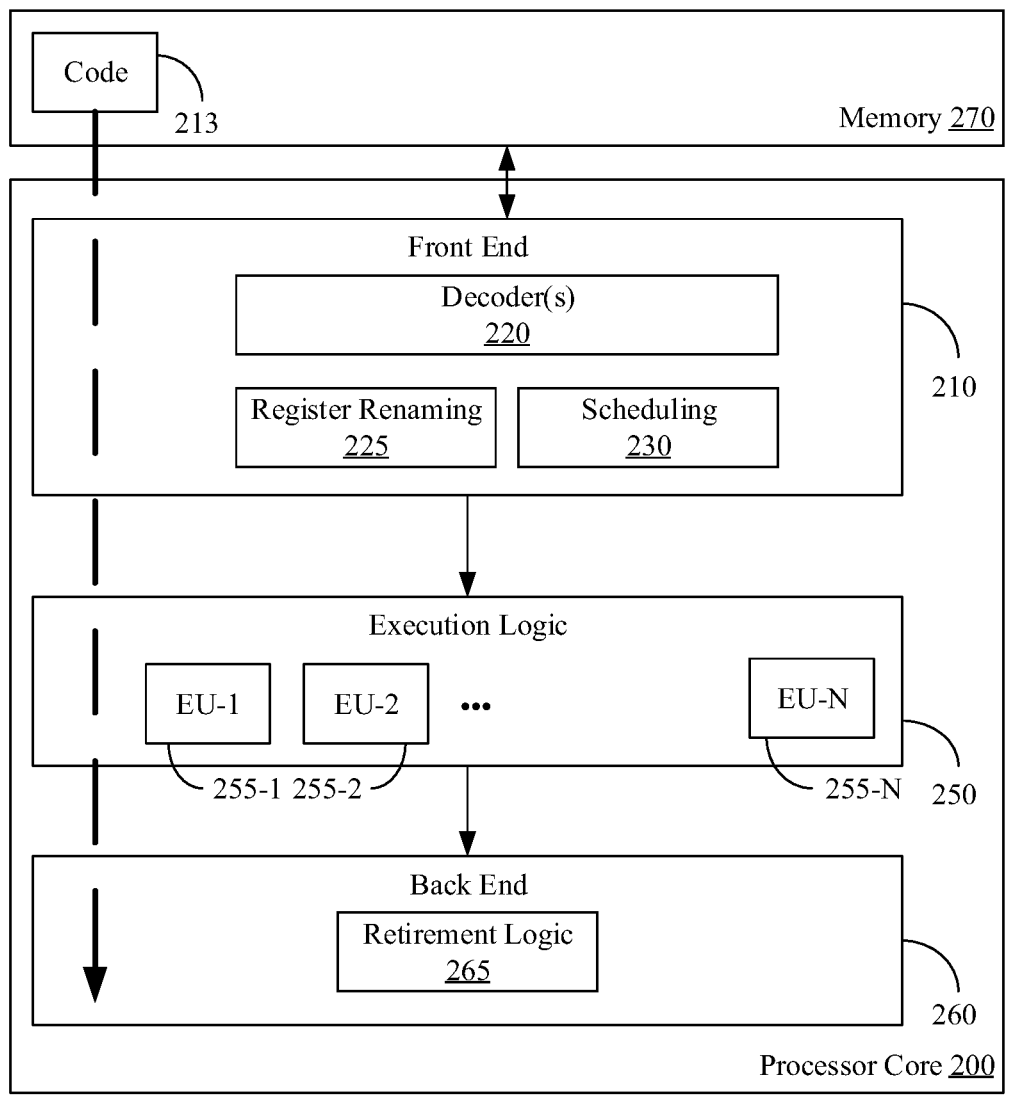
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the system 10, the apparatus 20, method 30, the flow 40, the WorkloadList structure 52, the M-level lattice 60, and/or any of the other embodiments described herein, already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the system 10, the apparatus 20, method 30, the flow 40, the WorkloadList structure 52, the M-level lattice 60, and/or any of the other embodiments described herein, already discussed, and may be similar to the code 213 (FIG. 8), already discussed. Further, an audio I/O 1024 may be coupled to second bus 1020.

Note that other embodiments are contemplated. For example, instead of the point-to-point architecture of FIG. 9, a system may implement a multi-drop bus or another such communication topology.

ADDITIONAL NOTES AND EXAMPLES

Example 1 includes an electronic processing system, comprising a processor, memory communicatively coupled to the processor, and compiler logic communicatively coupled to the processor to identify workload control variables, add workload flags to respective edges in a static single assignment graph, and propagate constants based on the identified workload control variables and the workload flags.

Example 2 includes the system of Example 1, wherein the compiler logic is further to receive a compiler directive to identify the workload control variables.

Example 3 includes the system of any of Examples 1 to 2, wherein the compiler logic is further to identify the workload control variables through a static analysis of code to be compiled.

Example 4 includes the system of any of Examples 1 to 3, wherein the compiler logic is further to constrain compiler time and space complexity under an asymptotic bounds for constant propagation based on the identified workload control variables and the workload flags.

Example 5 includes the system of any of Examples 1 to 4, wherein the compiler logic is further to utilize an M-level lattice and depth first search to trace constant footprints, where M is greater than or equal to one.

Example 6 includes the system of Example 5, wherein the constant footprints include one or more of global constants and partial constant instances.

Example 7 includes a semiconductor package apparatus for use with a compiler, comprising one or more substrates, and logic coupled to the one or more substrates, wherein the logic is at least partly implemented in one or more of configurable logic and fixed-functionality hardware logic, the logic coupled to the one or more substrates to identify workload control variables, add workload flags to respective edges in a static single assignment graph, and propagate constants based on the identified workload control variables and the workload flags.

Example 8 includes the apparatus of Example 7, wherein the logic is further to receive a compiler directive to identify the workload control variables.

Example 9 includes the apparatus of any of Examples 7 to 8, wherein the logic is further to identify the workload control variables through a static analysis of code to be compiled.

Example 10 includes the apparatus of any of Examples 7 to 9, wherein the logic is further to constrain compiler time and space complexity under an asymptotic bounds for constant propagation based on the identified workload control variables and workload flags.

Example 11 includes the apparatus of any of Examples 7 to 10, wherein the logic is further to utilize an M-level lattice and depth first search to trace constant footprints, where M is greater than or equal to one.

Example 12 includes the apparatus of Example 11, wherein the constant footprints include one or more of global constants and partial constant instances.

Example 13 includes the apparatus of any of Examples 7 to 12, wherein the logic coupled to the one or more substrates includes transistor channel regions that are positioned within the one or more substrates.

Example 14 includes a method of compiling, comprising identifying workload control variables, adding workload flags to respective edges in a static single assignment graph, and propagating constants based on the identified workload control variables and the workload flags.

Example 15 includes the method of Example 14, further comprising receiving a compiler directive to identify the workload control variables.

Example 16 includes the method of any of Examples 14 to 15, further comprising identifying the workload control variables through a static analysis of code to be compiled.

Example 17 includes the method of any of Examples 14 to 16, further comprising constraining compiler time and space complexity under an asymptotic bounds for constant propagation based on the identified workload control variables and workload flags.

Example 18 includes the method of any of Examples 14 to 17, further comprising utilizing an M-level lattice and depth first search to trace constant footprints, where M is greater than or equal to one.

Example 19 includes the method of Example 18, wherein the constant footprints include one or more of global constants and partial constant instances.

Example 20 includes at least one computer readable storage medium, comprising a set of instructions, which when executed by a computing device, cause the computing device to identifying workload control variables, adding workload flags to respective edges in a static single assignment graph, and propagating constants based on the identified workload control variables and the workload flags.

Example 21 includes the at least one computer readable storage medium of Example 20, comprising a further set of instructions, which when executed by the computing device, cause the computing device to receiving a compiler directive to identify the workload control variables.

Example 22 includes the at least one computer readable storage medium of Example 20, comprising a further set of instructions, which when executed by the computing device, cause the computing device to identifying the workload control variables through a static analysis of code to be compiled.

Example 23 includes the at least one computer readable storage medium of Example 20, comprising a further set of instructions, which when executed by the computing device, cause the computing device to constraining compiler time and space complexity under an asymptotic bounds for constant propagation based on the identified workload control variables and workload flags.

Example 24 includes the at least one computer readable storage medium of Example 20, comprising a further set of instructions, which when executed by the computing device, cause the computing device to utilizing an M-level lattice and depth first search to trace constant footprints, where M is greater than or equal to one.

Example 25 includes the at least one computer readable storage medium of Example 24, wherein the constant footprints include one or more of global constants and partial constant instances.

Example 26 includes a compiler apparatus, comprising means for identifying workload control variables, means for adding workload flags to respective edges in a static single assignment graph, and means for propagating constants based on the identified workload control variables and the workload flags.

Example 27 includes the apparatus of Example 26, further comprising means for receiving a compiler directive to identify the workload control variables.

Example 28 includes the apparatus of any of Examples 26 to 27, further comprising means for identifying the workload control variables through a static analysis of code to be compiled.

Example 29 includes the apparatus of any of Examples 26 to 28, further comprising means for constraining compiler time and space complexity under an asymptotic bounds for constant propagation based on the identified workload control variables and workload flags.

Example 30 includes the apparatus of any of Examples 26 to 29, further comprising means for utilizing an M-level lattice and depth first search to trace constant footprints, where M is greater than or equal to one.

Example 31 includes the apparatus of Example 30, wherein the constant footprints include one or more of global constants and partial constant instances.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:

1. An electronic processing system, comprising:
   a processor;
   memory communicatively coupled to the processor; and
   compiler logic communicatively coupled to the processor to:
      generate a static single assignment graph from source code to be compiled;
      identify workload control variables based on one or more compiler directives,
      add workload flags to respective edges in the static single assignment graph, wherein the workload flags are to indicate whether the respective edges link to the identified workload control variables,
      propagate constants based on the identified workload control variables and the workload flags to a kernel procedure; and
      generate executable code based on the propagated constants.

2. The system of claim 1, wherein the compiler logic is further to:
   receive the compiler directive, wherein the compiler directive is to identify the workload control variables.

3. The system of claim 1, wherein the compiler logic is further to:
   identify the workload control variables through a static analysis of code to be compiled.

4. The system of claim 1, wherein the compiler logic is further to:
   constrain compiler time and space complexity under an asymptotic bounds for constant propagation based on the identified workload control variables and the workload flags.

5. The system of claim 1, wherein the compiler logic is further to:
   utilize an M-level lattice and depth first search to trace constant footprints, where M is greater than or equal to one.

6. The system of claim 5, wherein the constant footprints include one or more of global constants and partial constant instances.

7. A semiconductor package apparatus for use with a compiler, comprising:
   one or more substrates; and
   logic coupled to the one or more substrates, wherein the logic is at least partly implemented in one or more of configurable logic and fixed-functionality hardware logic, the logic coupled to the one or more substrates to:
      generate a static single assignment graph from source code to be compiled;
      identify workload control variables based on one or more compiler directives,
      add workload flags to respective edges in the static single assignment graph, wherein the workload flags are to indicate whether the respective edges link to the identified workload control variables,
      propagate constants based on the identified workload control variables and the workload flags to a kernel procedure, and
      generate executable code based on the propagated constants.

8. The apparatus of claim 7, wherein the logic is further to:
   receive the compiler directive, wherein the compiler directive is to identify the workload control variables.

9. The apparatus of claim 7, wherein the logic is further to:
   identify the workload control variables through a static analysis of code to be compiled.

10. The apparatus of claim 7, wherein the logic is further to:
    constrain compiler time and space complexity under an asymptotic bounds for constant propagation based on the identified workload control variables and workload flags.

11. The apparatus of claim 7, wherein the logic is further to:
    utilize an M-level lattice and depth first search to trace constant footprints, where M is greater than or equal to one.

12. The apparatus of claim 11, wherein the constant footprints include one or more of global constants and partial constant instances.

13. The apparatus of claim 7, wherein the logic coupled to the one or more substrates includes transistor channel regions that are positioned within the one or more substrates.

14. A method of compiling, comprising:
    generating a static single assignment graph from source code to be compiled;
    identifying workload control variables based on one or more compiler directives;
    adding workload flags to respective edges in the static single assignment graph, wherein the workload flags indicate whether the respective edges link to the identified workload control variables;
    propagating constants based on the identified workload control variables and the workload flags to a kernel procedure, and
    generating executable code based on the propagated constants.

15. The method of claim 14, further comprising:
    receiving the compiler directive, wherein the compiler directive is to identify the workload control variables.

16. The method of claim 14, further comprising:
    identifying the workload control variables through a static analysis of code to be compiled.

17. The method of claim 14, further comprising:
    constraining compiler time and space complexity under an asymptotic bounds for constant propagation based on the identified workload control variables and workload flags.

18. The method of claim 14, further comprising:
    utilizing an M-level lattice and depth first search to trace constant footprints, where M is greater than or equal to one.

19. The method of claim 18, wherein the constant footprints include one or more of global constants and partial constant instances.

20. At least one computer readable storage medium, comprising a set of instructions, which when executed by a computing device, cause the computing device to:
    generating a static single assignment graph from source code to be compiled;
    identifying workload control variables based on one or more compiler directives;

adding workload flags to respective edges in the static single assignment graph, wherein the workload flags are to indicate whether the respective edges link to the identified workload control variables;

propagating constants based on the identified workload control variables and the workload flags to a kernel procedure, and generating executable code based on the propagated constants.

21. The at least one computer readable storage medium of claim 20, comprising a further set of instructions, which when executed by the computing device, cause the computing device to:

receiving the compiler directive, wherein the compiler directive is to identify the workload control variables.

22. The at least one computer readable storage medium of claim 20, comprising a further set of instructions, which when executed by the computing device, cause the computing device to:

identifying the workload control variables through a static analysis of code to be compiled.

23. The at least one computer readable storage medium of claim 20, comprising a further set of instructions, which when executed by the computing device, cause the computing device to:

constraining compiler time and space complexity under an asymptotic bounds for constant propagation based on the identified workload control variables and workload flags.

24. The at least one computer readable storage medium of claim 20, comprising a further set of instructions, which when executed by the computing device, cause the computing device to:

utilizing an M-level lattice and depth first search to trace constant footprints, where M is greater than or equal to one.

25. The at least one computer readable storage medium of claim 24, wherein the constant footprints include one or more of global constants and partial constant instances.

* * * * *